United States Patent
Lin

(10) Patent No.: US 10,621,424 B2
(45) Date of Patent: Apr. 14, 2020

(54) MULTI-LEVEL STATE DETECTING SYSTEM AND METHOD

(71) Applicant: Wistron Corporation, New Taipei (TW)

(72) Inventor: Zhao-Yuan Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 239 days.

(21) Appl. No.: 15/961,596

(22) Filed: Apr. 24, 2018

(65) Prior Publication Data

US 2019/0303656 A1    Oct. 3, 2019

(30) Foreign Application Priority Data

Mar. 27, 2018   (TW) .............................. 107110400 A

(51) Int. Cl.
*G06K 9/00*   (2006.01)
*G08B 21/04*   (2006.01)
(Continued)

(52) U.S. Cl.
CPC ......... *G06K 9/00335* (2013.01); *G06F 17/18* (2013.01); *G06K 9/00228* (2013.01);
(Continued)

(58) Field of Classification Search
CPC ........... G06K 9/00221; G06K 9/00228; G06K 9/00288; G06K 9/00302; G06K 9/00308;
(Continued)

(56) References Cited

U.S. PATENT DOCUMENTS

| | | | |
|---|---|---|---|
| 8,253,786 B2 | 8/2012 | She | .............................. 348/77 |
| 2009/0190803 A1* | 7/2009 | Neghina et al. | ....... H04N 5/232 |
| | | | 382/118 |

(Continued)

FOREIGN PATENT DOCUMENTS

| | | | | |
|---|---|---|---|---|
| CN | 105574215 A | 5/2016 | ............. | G06F 17/30 |
| CN | 107330387 A | 11/2017 | ............... | G06F 9/00 |

(Continued)

OTHER PUBLICATIONS

Joseph Redmon et al., "You Only Look Once: Unified, Real-Time Object Detection," 2016 IEEE Conference on Computer Vision and Pattern Recognition, pp. 779-788.

(Continued)

*Primary Examiner* — Andrew W Johns
(74) *Attorney, Agent, or Firm* — Donald E. Stout; Stout, Uxa & Buyan, LLP

(57) ABSTRACT

A multi-level state detecting system includes an image capture device for capturing an image of a subject; a site detecting unit for detecting a person in the image; a face recognition unit for detecting a face in the image via a face recognition database; a multi-level state identification unit for determining corresponding state and probability of the subject; a neural network prediction model database storing trained neural network prediction model associated with state classifications, the multi-level state identification unit identifying corresponding state of the subject when the face recognition unit does not detect the face; and a multi-level state updating unit for generating a final state according to a current state and at least one previous state received from the multi-level state identification unit.

20 Claims, 4 Drawing Sheets

(51) Int. Cl.
    *G06N 5/04* (2006.01)
    *G06F 17/18* (2006.01)
(52) U.S. Cl.
    CPC ..... *G06K 9/00288* (2013.01); *G06K 9/00362* (2013.01); *G06N 5/046* (2013.01); *G08B 21/0438* (2013.01)
(58) Field of Classification Search
    CPC ........... G06K 9/00315; G06K 9/00335; G06K 9/00362; G08B 21/04; G08B 21/0438; G08B 21/0476; G08B 21/06; A61B 5/4809
    See application file for complete search history.

(56) References Cited

U.S. PATENT DOCUMENTS

| | | | | |
|---|---|---|---|---|
| 2011/0115920 A1* | 5/2011 | Wang et al. | ....... | G06K 9/00778 348/169 |
| 2011/0261182 A1* | 10/2011 | Lee et al. | ............. | A61B 5/1079 348/77 |
| 2016/0364617 A1 | 12/2016 | Silberschatz et al. | ........................ | G06K 9/00771 |
| 2018/0314881 A1* | 11/2018 | Sud et al. | .......... | G06K 9/00671 |
| 2019/0130720 A1* | 5/2019 | Lui | ..................... | G06K 9/00302 |
| 2019/0370580 A1* | 12/2019 | Aoi et al. | .................. | G06T 7/00 |

FOREIGN PATENT DOCUMENTS

| | | | | |
|---|---|---|---|---|
| TW | 201118802 A1 | 6/2011 | | |
| TW | 201137795 A1 | 11/2011 | | |
| WO | WO2016/119076 A1 | 8/2016 | ............... | G06K 9/66 |

OTHER PUBLICATIONS

Office Action dated Jan. 10, 2019 in corresponding Taiwan Patent Application No. 107110400.

* cited by examiner

MULTI-LEVEL STATE DETECTING SYSTEM AND METHOD

CROSS-REFERENCE TO RELATED APPLICATIONS

This application claims priority of Taiwan Patent Application No. 107110400, filed on Mar. 27, 2018, the entire contents of which are hereby incorporated by reference.

BACKGROUND OF THE INVENTION

1. Field of the Invention

The present invention generally relates to a monitor, and more particularly to a multi-level state detecting system and method.

2. Description of Related Art

A baby monitor is a radio system used to remotely listen to sounds made by a baby or watch image captured of a baby. For example, a microphone is placed near to the baby to record sounds of the baby, and the recorded sound can thus be remotely heard by a speaker. A video camera (also called a baby cam) is placed near to the baby to capture image of the baby, and the captured image can then be transferred to and shown in a remote display.

Conventional baby monitors merely transfer unprocessed image and/or sound, and thus limited information, to parents. Advanced baby monitors may adopt wearable sensors such as g-sensor, which may, however, cause discomfort. Some baby beds are embedded with monitoring sensors such as pressure sensor, which may only at best determine sleep quality but not real sleeping state. Further, conventional baby monitors cannot detect urgent state such as face covered, and thus cannot take quick measures to exclude the urgent situations.

A need has thus arisen to propose a novel state detecting scheme in order to overcome disadvantages of conventional baby monitors.

SUMMARY OF THE INVENTION

In view of the foregoing, it is an object of the embodiment of the present invention to provide a multi-level state detecting system and method, which use deep neural network to perform multi-level machine learning in order to detect a variety of states of a subject (e.g., a baby) and provide corresponding state probabilities with higher accuracy.

According to one embodiment, a multi-level state detecting system includes an image capture device, a site detecting unit, a face recognition unit, a multi-level state identification unit, a neural network prediction model database and a multi-level state updating unit. The image capture device captures an image of a subject. The site detecting unit detects a person in the image. The face recognition unit detects a face in the image via a face recognition database. The multi-level state identification unit determines corresponding state and probability of the subject according to a detecting result of the face recognition unit. The neural network prediction model database stores trained neural network prediction model associated with state classifications, and the multi-level state identification unit identifies corresponding state of the subject when the face recognition unit does not detect the face. The multi-level state updating unit generates a final state according to a current state probability and at least one previous state probability received from the multi-level state identification unit.

DETAILED DESCRIPTION OF THE INVENTION

Figure 1:
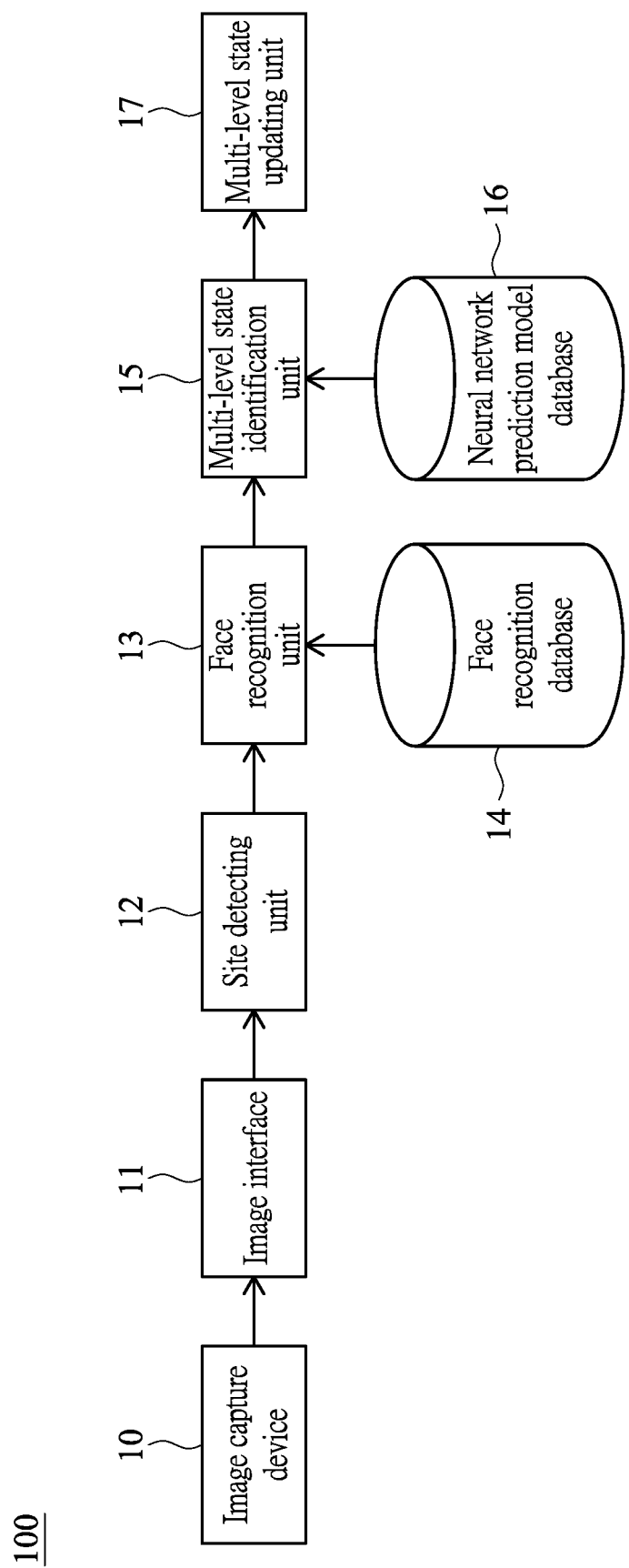
FIG. 1 shows a block diagram illustrating a multi-level state detecting system according to one embodiment of the present invention.
Figure 2:
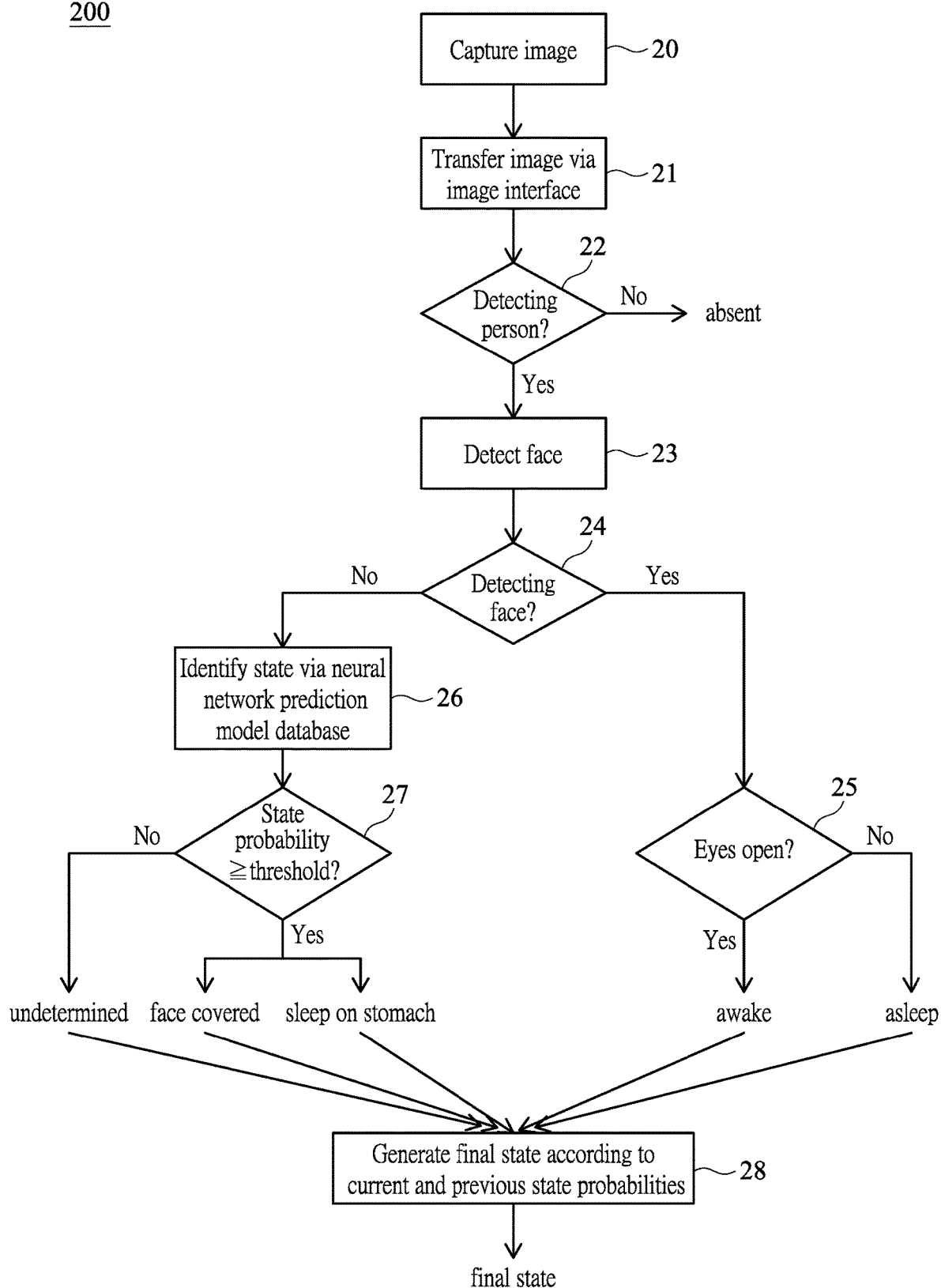
FIG. 2 shows a flow diagram illustrating a multi-level state detecting method according to one embodiment of the present invention.

FIG. 1 shows a block diagram illustrating a multi-level state detecting system 100 according to one embodiment of the present invention. The embodiment may be adaptable to detecting a sleeping state of a baby or a person other than the baby (e.g., an old person), and may be adaptable to detecting a state other than the sleeping state. The blocks of FIG. 1 may be implemented by hardware and/or software. FIG. 2 shows a flow diagram illustrating a multi-level state detecting method 200 according to one embodiment of the present invention.

In the embodiment, the multi-level state detecting system 100 ("detecting system" hereinafter) may include an image capture device 10 configured to capture an image of a subject (e.g., a baby) (step 20). In one example, the image capture device 10 may be a video camera configured to capture a sequence of images, at least a portion of which may be processed later. The video camera may be a red-green-blue-infrared (RGB-IR) video camera, which can capture an image that is more extensive than a visible-light video camera without being limited to ambient light. In another example, the image capture device 10 may be a camera configured to capture an image at a time, regularly or according to schedule, which may be processed later.

The detecting system 100 of the embodiment may include an image interface 11 disposed between the image capture device 10 and other components of the detecting system 100, and configured to transfer the image or images captured by the image capture device 10 (step 21). The image interface 11 may be utilized to support application functions such as, but not limited to, selecting, installing, configuring, setting parameters and accessing data. Accordingly, the image capture device 10 can effectively capture and transfer images. In the embodiment, the image interface 11 may include Video4Linus version 2 (V4L2) image interface, which supports a real time image capture device driver and application programming interface (API) of Linus operating system.

The detecting system 100 of the embodiment may include a site detecting unit 12 configured to receive the image transferred by the image interface 11, and to detect a person (e.g., a baby) and an associated position in the image (step 22). If no person is detected, it indicates that the subject (e.g., baby) is absent; otherwise, the flow goes to step 23.

In the embodiment, the site detecting unit 12 adopts You Only Look once (YOLO) object detection technique, which uses single neural network to process an entire image. Compared to conventional object detection technique that performs individual trainings with respect to different areas, YOLO object detection technique can thus accelerate computation. Details of YOLO object detection technique may be referred to "You Only Look Once: Unified, Real-Time Object Detection," entitled to Joseph Redmon et al., 2016 IEEE Conference on Computer Vision and Pattern Recognition (CVPR), the disclosure of which is incorporated herein by reference.

The detecting system 100 of the embodiment may include a face recognition unit 13 and a face recognition database (or function library) 14. Specifically, the face recognition unit 13 may receive the image transferred by the image interface 11, and extract facial features from the image. The extracted facial features are then compared with facial features stored in the face recognition database 14 (step 23) to detect a face in the image. In the embodiment, the face recognition database 14 may adopt, but not limited to, multi-task cascaded convolutional neutral network (MTCNN) technique, which is robust about light, angle and facial expression in neutral environment, and the recognition efficiency is thus better than conventional face recognition methods such as Open Source Computer Vision (OpenCV) or dlib. Specifically, OpenCV adopts Haar feature-based classifiers, which cannot recognize side, slanting or dark face. Dlib enhances OpenCV but cannot achieve real time face recognition. Due to small storage amount, MTCNN can achieve real time face recognition. Details of MTCNN may be referred to "Joint Face Detection and Alignment using Multi-task Cascaded Convolutional Networks," entitled to Kaipeng Zhang et al., 2016 IEEE Signal Processing Letters, the disclosure of which is incorporated herein by reference.

The detecting system 100 of the embodiment may include a multi-level state identification unit 15 configured to receive detecting results of the face recognition unit 13 and accordingly to perform identification to determine corresponding state (e.g., sleeping state of a baby). In one example, if the face recognition unit 13 detects a face (step 24), the multi-level state identification unit 15 may further identify open eyes or closed eyes (step 25) to correspondingly determine awake state or asleep state. Moreover, the multi-level state identification unit 15 may generate probability of awake state or asleep state according to extent of open eyes.

The detecting system 100 of the embodiment may include a neural network prediction model database 16 that stores trained neural network prediction model associated with state classifications. In one example, state classifications of the neural network prediction database 16 may include face covered and sleep on stomach. In the embodiment, if the multi-level state identification unit 15 receives (from face recognition unit 13) detecting results indicating that no face is detected (step 24), the multi-level state identification unit 15 then identifies corresponding state classification (step 26) (e.g., face covered or sleep on stomach) in the image via the neural network prediction model database 16. Further, the multi-level state identification unit 15 may generate probabilities of the state classifications (e.g., face covered and sleep on stomach) according to extent of conformation between the image and the neural network prediction model database 16. If all the probabilities of state classifications are not greater than or equal to a predetermined threshold (step 27), the image is set undetermined. The neural network prediction model database 16 of the embodiment may adopt, but not limited to, Inception module technique proposed by Google®. Details of Inception module may be referred to "Going Deeper with Convolutions," entitled to Christian Szegedy et al., 2015 IEEE Conference on Computer Vision and Pattern Recognition (CVPR), the disclosure of which is incorporated herein by reference.

In one example, state classifications of a baby may include face covered, sleep on stomach, absent, awake and asleep, where face covered and sleep on stomach are obtained from step 27, absent is obtained from step 22, and awake and asleep are obtained from step 25. The state probabilities may be expressed in array form as follows:

[face covered sleep on stomach absent awake asleep] where sum of all probabilities is equal to 1.

For example, if the face recognition unit 13 detects the face and the multi-level state identification unit 15 identifies open eyes, the state probability array may be [0 0 0 0.7 0.3]. If the multi-level state identification unit 15 identifies face covered via the neural network prediction model database 16, the state probability array may be [0.6 0.2 0.2 0 0]. If the face recognition unit 13 does not detect a face, and all the probabilities of state classifications are not greater than or equal to predetermined threshold 0.6, the multi-level state identification unit 15 sets the image undetermined.

The detecting system 100 of the embodiment may include a multi-level state updating unit 17 configured to receive a current and previous state probabilities, according to which a final state is generated (step 28). Accordingly, the final state generated by the multi-level state updating unit 17 has accuracy higher than the state determined by the multi-level state identification unit 15.

In one example, the multi-level state updating unit 17 generates a weighted sum (as the final state probability) of a previous state probability S1 and a current state probability S0:

$$S1*\alpha + S0*(1-\alpha)$$

where $\alpha$ is a weight.

Generally speaking, a weighted sum (as the final state probability) with respect to plural previous state probabilities may be expressed as follows:

$$\sum_{2}^{n} Si * \left(\frac{\alpha}{2(n-2)}\right) + S1 * \left(\frac{\alpha}{2}\right) + S0 * (1-\alpha)$$

where S0 is a current state probability, S1 is a previous state probability, Si's are (n−1) previous state probabilities preceding S1, and $\alpha$ is a weight.

Figure 3:
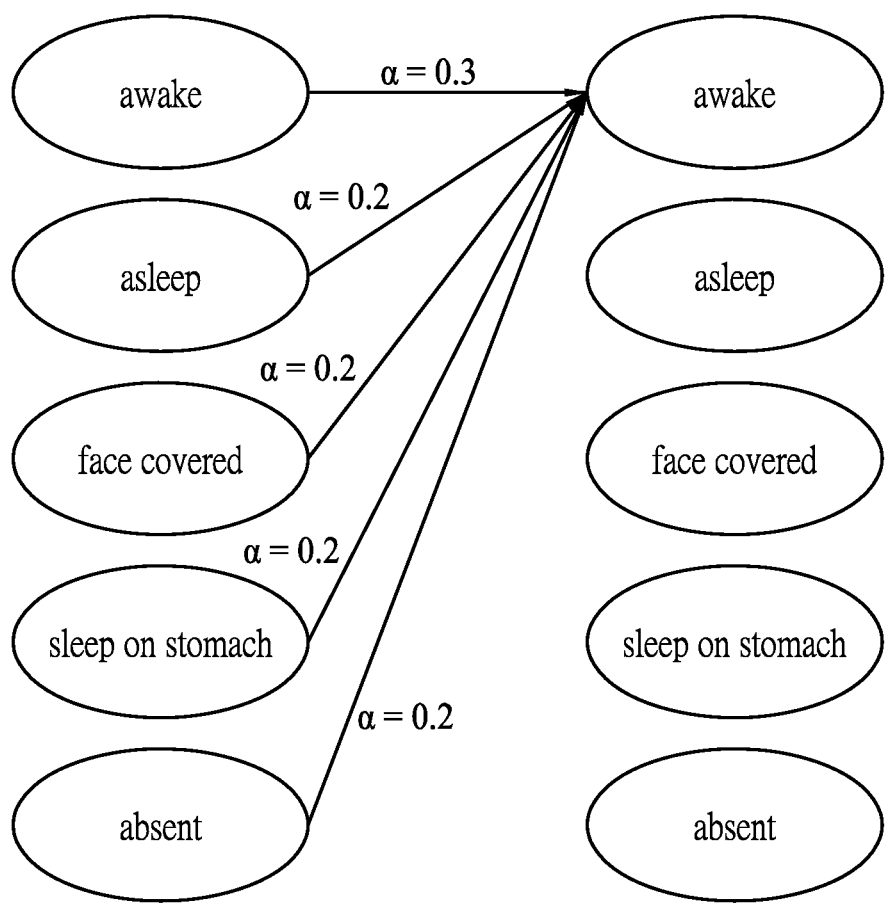
FIG. 3 shows one example of generating a final state by the multi-level state updating unit.

FIG. 3 shows one example of generating a final state by the multi-level state updating unit 17. Regarding a normal state (e.g., awake state), as there is a strong link between current awake state and previous awake state (that is, if the subject is currently awake, the subject may probably be awake previously), a larger weight $\alpha$ (e.g., 0.3) is assigned to a same previous state probability, but a smaller weight $\alpha$ (e.g., 0.2) is assigned to a different previous state probability.

Figure 4:
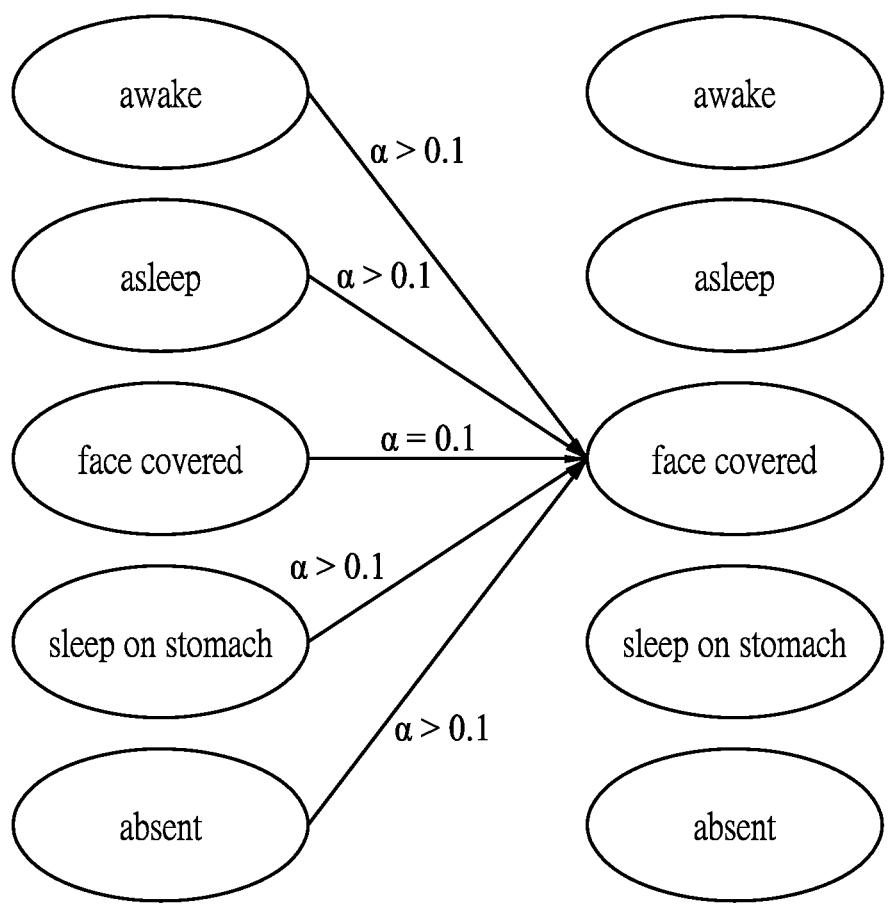
FIG. 4 shows another example of generating a final state by the multi-level state updating unit.

FIG. 4 shows another example of generating a final state by the multi-level state updating unit 17. Regarding an urgent state (e.g., face covered), in order not to miss the urgent state, a smaller weight $\alpha$ (e.g., 0.1) is assigned to a same previous state probability, but a larger weight $\alpha$ assigned to a different previous state probability.

In one example, weights $\alpha$'s assigned to different previous states may be different. For example, the stronger is the link between the current state and the different previous state, the larger is the weight $\alpha$ to that different previous state.

Although specific embodiments have been illustrated and described, it will be appreciated by those skilled in the art that various modifications may be made without departing from the scope of the present invention, which is intended to be limited solely by the appended claims.

What is claimed is:

1. A multi-level state detecting system, comprising:
    an image capture device that captures an image of a subject;
    a site detecting unit that detects a person in the image;
    a face recognition unit that detects a face in the image via a face recognition database;
    a multi-level state identification unit that determines corresponding state and probability of the subject according to a detecting result of the face recognition unit;
    a neural network prediction model database storing trained neural network prediction model associated with state classifications, the multi-level state identification unit identifying corresponding state of the subject when the face recognition unit does not detect the face; and
    a multi-level state updating unit that generates a final state according to a current state probability and at least one previous state probability received from the multi-level state identification unit.

2. The system of claim 1, wherein the face recognition database is generated by multi-task cascaded convolutional neutral network (MTCNN) technique.

3. The system of claim 1, wherein if the face recognition unit detects the face, the multi-level state identification unit identifies open eyes or closed eyes of the detected face to correspondingly determine awake state or asleep state.

4. The system of claim 1, wherein the state classifications of the neural network prediction database comprise face covered and sleep on stomach.

5. The system of claim 1, wherein if probabilities of all the state classifications are not greater than or equal to a predetermined threshold, the image is set undetermined by the multi-level state identification unit.

6. The system of claim 1, wherein the neural network prediction model database adopts Inception module technique proposed by Google®.

7. The system of claim 1, wherein the multi-level state updating unit generates a weighted sum of a previous state probability S1 and a current state probability S0 expressed as follows:

$$S1*\alpha+S0*(1-\alpha)$$

where $\alpha$ is a weight, and the weighted sum acts as probability of the final state.

8. The system of claim 7, wherein regarding an urgent state, a smaller weight is assigned to a same previous state, but a larger weight assigned to a different previous state.

9. The system of claim 7, wherein the multi-level state updating unit assigns different weightings to different previous states, wherein the stronger is link between the current state and the different previous state, the larger is the weight assigned to said different previous state.

10. The system of claim 1, wherein the multi-level state updating unit generates a weighted sum with respect to plural previous state probabilities expressed as follows:

$$\sum_{2}^{n} Si*\left(\frac{\alpha}{2(n-2)}\right)+S1*\left(\frac{\alpha}{2}\right)+S0*(1-\alpha)$$

where S0 is a current state probability, S1 is a previous state probability, Si's are (n−1) previous state probabilities preceding S1, $\alpha$ is a weight, and the weighted sum acts as probability of the final state.

11. A multi-level state detecting method, comprising:
    (a) capturing an image of a subject;
    (b) detecting a person in the image;
    (c) detecting a face in the image via a face recognition database;
    (d) determining corresponding state and probability of the subject according to a detecting result of step (c);
    (e) providing a neural network prediction model database storing trained neural network prediction model associated with state classifications, identifying corresponding state of the subject via the neural network prediction model database when step (c) does not detect the face; and
    (f) generating a final state according to a current state probability and at least one previous state probability.

12. The method of claim 11, wherein the face recognition database is generated by multi-task cascaded convolutional neutral network (MTCNN) technique.

13. The method of claim 11, wherein if step (c) detects the face, open eyes or closed eyes of the detected face are identified to correspondingly determine awake state or asleep state.

14. The method of claim 11, wherein the state classifications of the neural network prediction database comprise face covered and sleep on stomach.

15. The method of claim 11, wherein if probabilities of all the state classifications are not greater than or equal to a predetermined threshold, the image is set undetermined.

16. The method of claim 11, wherein the neural network prediction model database adopts Inception module technique proposed by Google®.

17. The method of claim 11, wherein step (f) generates a weighted sum of a previous state probability S1 and a current state probability S0 expressed as follows:

$$S1*\alpha+S0*(1-\alpha)$$

where $\alpha$ is a weight, and the weighted sum acts as probability of the final state.

18. The method of claim 17, wherein regarding an urgent state, a smaller weight is assigned to a same previous state, but a larger weight assigned to a different previous state.

19. The method of claim 17, wherein step (f) assigns different weightings to different previous states, wherein the stronger is link between the current state and the different previous state, the larger is the weight assigned to said different previous state.

20. The method of claim 11, wherein step (f) generates a weighted sum with respect to plural previous state probabilities expressed as follows:

$$\sum_{2}^{n} Si*\left(\frac{\alpha}{2(n-2)}\right)+S1*\left(\frac{\alpha}{2}\right)+S0*(1-\alpha)$$

where S0 is a current state probability, S1 is a previous state probability, Si's are (n−1) previous state probabilities preceding S1, $\alpha$ is a weight, and the weighted sum acts as probability of the final state.

* * * * *